United States Patent [19]

Gottlieb et al.

[11] Patent Number: 4,555,160

[45] Date of Patent: Nov. 26, 1985

[54] METHOD AND APPARATUS FOR STRAIN RELIEVING TRANSDUCERS BONDED TO ACOUSTO-OPTIC DEVICES

[75] Inventors: Milton Gottlieb, Pittsburgh; Kenneth B. Steinbruegge, Murrysville, both of Pa.

[73] Assignee: Westinghouse Electric Corp., Pittsburgh, Pa.

[21] Appl. No.: 403,954

[22] Filed: Aug. 2, 1982

[51] Int. Cl.[4] ................................................ G02F 1/33
[52] U.S. Cl. .................................................... 350/358
[58] Field of Search ........................................ 350/358

[56] References Cited

U.S. PATENT DOCUMENTS 4,162,121  7/1979  Starkweather et al. ............. 350/358

OTHER PUBLICATIONS

Voshol & Spiekerman, "Acoustooptic ... Transducer", IEEE Trans. Sonics & Ultrasonics, vol. SU-22, No. 2, Mar. 1975.

Weinert et al., "A Thin Film Mosaic Transducer for Bulk Waves", IEEE Trans. on Sonics & Ultrasonics, vol. SU-19, No. 3, Jul. 1972, pp. 354-357.

Korpel et al., "A Television Display Using Acoustic Deflection and Modulation of Coherent Light", Proc. IEEE, vol. 54, pp. 1429-1437, Oct. 1966.

Primary Examiner—John K. Corbin
Assistant Examiner—Bruce S. Shapiro
Attorney, Agent, or Firm—Thomas R. Trempus

[57] ABSTRACT

A transducer plate having at least two mounting zones separated by a transverse groove of a depth greater than the desired thickness of the transducer plate obtained after polishing the mounted transducer plate, and a method for mounting the transducer plate to an optical medium to form an acousto-optic device are disclosed.

3 Claims, 2 Drawing Figures

METHOD AND APPARATUS FOR STRAIN RELIEVING TRANSDUCERS BONDED TO ACOUSTO-OPTIC DEVICES

BACKGROUND OF THE INVENTION

1. Field of the Invention

The invention is directed to acousto-optic devices. More particularly, this invention is a method of relieving the mechanical stress between the transducer plate and the optical medium thus substantially reducing undesirable strain-optic effects. The invention also provides a transducer plate for effecting this reduction in mechanical stress.

2. Description of the Prior Art

Acousto-optic devices generally consist of a transducer plate and a transparent optical medium through which acoustic waves generated by the transducer propagate. While the transducer is typically a piezoelectric crystal such as lithium niobate, other materials including quartz and PZT (lead-titanate-zirconate) are often used. The optical medium may be glass, such as fused silica or it may be crystalline, such as tellurium dioxide ($TeO_2$) or thallium arsenic selenide ($Tl_3AsSe_3$). Typically, a bond of high acoustic quality between the transducer and the optical medium can be obtained by the following process. A thin film of metal, such as indium, is deposited on the surface of the transducer and on the surface of the optical medium which are to be mated. While under mechanical pressure, the combined transducer and optical medium are heated in a vacuum oven to the melting point of the metal film and then cooled to ambient temperature. Indium requires heating to about 155° C. Other types of bonding methods, including the use of an epoxy, typically require that the bonding procedure be carried out at an elevated temperature. Once the bond is established, the transducer is polished down to a thickness determined by the frequency of operation of the device. In these bonding methods, one electrode is first deposited on the optical medium. After bonding and polishing, the second electrode is deposited on the transducer.

These fabrication procedures present several problems in acousto-optic devices. Because the transducer and the optical medium have different thermal expansion coefficients, the portion of each member near the bond is under mechanical stress when the acousto-optic device is cooled from its bond formation temperature. The mechanical stress produces very undesirable strain-optic effects which distort the optical properties of the optical medium by inducing birefringence. Such an effect often renders the device useless for many applications. When the transducer is polished to a small thickness, often as small as 0.025 $\mu$mm. for high frequency operations, it is subject to stress cracking due to the mechanical stress forces at the interface with the optical medium. This cracking generally renders the transducer useless.

A problem that arises with large area transducers, on the order of several square centimeters, or even with small area transducers at very high frequencies, is that of matching the electrical impedance of the transducer to that of the electrical driver. It is especially true for the materials of a very high dielectric constant that the impedance of the transducer may be so low that it becomes difficult to efficiently couple electrical power to the transducer. This problem can be largely overcome by electrically dividing the transducer into series connected mosaic elements, as taught by Weinert and deKlerk (IEEE Trans. on Sonics and Ultrasonics, SU-19, 354; July 1972). If a transducer of a given area is divided into N elements, the capacitive impedance of the transducer will be reduced by a factor of $N^2$. This is accomplished by an electrode pattern that is deposited both under and on top of a transducer plate. These electrode patterns are electrically connected in series. Through this method, the capacitive impedance of the transducer can be modified to match the fifty ohms impedance of the electrical driver.

It is an object of this invention to provide a method for bonding a transducer plate to an optical medium so that mechanical stress at the interface of the bond is substantially eliminated.

It is also an object of this invention to provide a transducer plate for use with an optical medium. The transducer plate facilitates handling and aligning with the optical medium during bonding operations. After polishing is completed the transducer plate of this invention is reduced to a series of individual transducer elements bonded to the optical medium.

SUMMARY OF THE INVENTION

The invention is directed to a technique for the reduction of stress in an acousto-optic device. The technique includes providing at least one groove of predetermined depth in the first surface of a transducer plate. The grooved first surface defines at least two mounting zones separated by the groove. The transducer plate is bonded to the optical medium according to a method known in the art so that the mounting zones on the first surface of the transducer are properly affixed to the optical medium. The exposed second surface of the transducer plate is polished to reduce the transducer plate thickness to a predetermined dimension according to the frequency operation of the device. The predetermined depth of the grooves between the mounting zones is at least as great as the desired thickness of the polished transducer plate. Once polishing is completed and the desired transducer plate thickness obtained, separated transducer plate elements remain bonded to the optical medium.

BRIEF DESCRIPTION OF THE DRAWINGS

The above as well as other features and advantages of this invention will become apparent through consideration of the detailed description in connection with the accompanying drawings in which.

DETAILED DESCRIPTION OF THE PREFERRED EMBODIMENT

Figure 1:
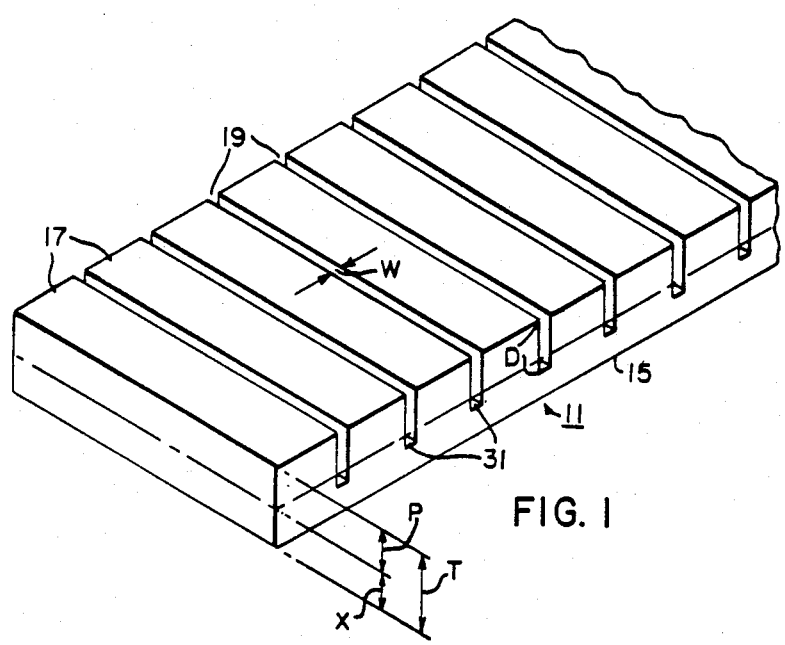
FIG. 1 is a perspective view of an acoustic transducer plate prepared for bonding with an optical medium according to the teachings of this invention.

The stresses produced along the surface of two dissimilar materials which are bonded together increase as the dimensions of the bonded surface increase. Turning to FIG. 1 it can be seen that a reduction of the mechanical stress between the acoustic transducer and the optical medium is achieved through the preparation of an acoustic transducer plate according to this invention. The transducer plate 11 has a first or bonding surface which faces the optical medium and a second surface 15 which is opposite thereto. The bonding surface consists of at least two, and typically a plurality of, spaced mounting zones 17 and transverse grooves 19 of predetermined depth 'D' between adjacent mounting zones 17. As will be hereinafter explained, each spaced mounting zone 17 will define a transducer plate element on the completed acousto-optic device. The transverse grooves 19 cut or etched into the transducer plate 11 effectively divide the large area of the bonding surface into several smaller bonding surfaces or mounting zones 17.

Figure 2:
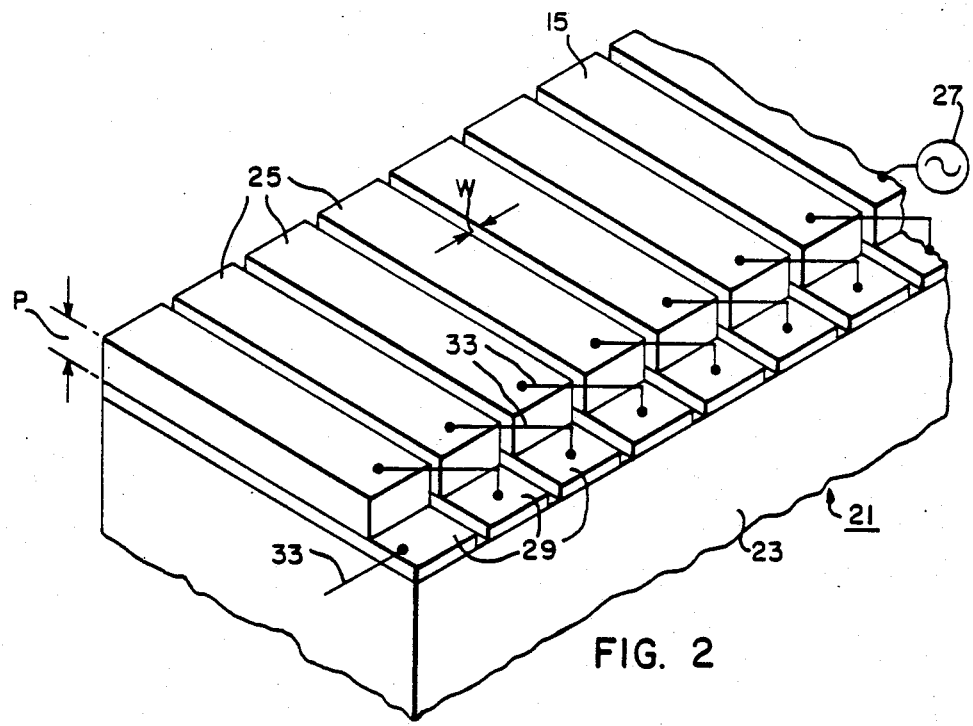
FIG. 2 is a perspective view of an acousto-optic device according to the present invention.

In FIG. 2, an acousto-optic device 21 includes an optical medium 23 and a series of transducer plate elements 25 which result from the application of the bonding method and transducer plate of this invention. As will be hereinafter described, the resulting series of transducer elements 25, are electrically connected in series to an RF signal generator 27. Such a configuration provides acceptable impedance matching characteristics and minimizes the mechanical strain through reducing the bonded, interface area between the transducer plate and the optical medium.

Considering both FIGS. 1 and 2, the transducer plate 11, prior to bonding, is typically of a greater initial thickness 'T', than necessary for the desired frequency operation. The final or polished thickness which is designated as 'P' and shown in dash-dot lines in FIG. 1, is less than the initial thickness 'T' of the transducer plate. The predetermined depth 'D' of the transverse grooves 19 is greater than the polished thickness 'P' of the transducer element 11 and less than the initial thickness 'T'. The width 'W' of the grooves 19 and the particular dimension of each mounting surface 17 can be designed to match the electrode pattern 29 provided on the surface of the optical medium 23. Accordingly, the number of transverse grooves 19 and mounting surfaces 17 may vary due to the size of the optical medium and the specific impedance requirements of the electrical driver.

After the transducer plate 11 is provided with the transverse grooves 19 of a predetermined depth 'D', the integral mounting zones 17 are bonded to the optical medium by a suitable method known to those skilled in the art. The transducer plate 11 remains intact for the bonding operation and as a result, the handling and aligning of the transducer with the optical medium is greatly facilitated. With the transducer's mounting surfaces 17 successfully bonded to the optical medium 23, the transducer is polished to the predetermined final thickness 'P'. During polishing, the excess thickness 'X' of the transducer plate 11 is removed. After the transducer plate is polished to a thickness below the bottom 31 of the grooves 19, the forces of differential expansion caused by bonding are substantially relieved and the undesirable strain-optic effects of bonding are greatly diminished. The elements 25 define separate transducers which can be electrically connected in series by leads 33 as illustrated in FIG. 2.

What has been described is an improved method for bonding a transducer to an optic device in order to provide an acousto-optic device substantially free from undesirable bonding effects and a transducer for effecting this method.

We claim:

1. A method of bonding a single acoustic transducer plate to an optical medium to form an acousto-optic device having at least two separate transducer elements, said single acoustic transducer plate having a first surface which is to be bonded to said optical medium and a second exposed surface opposite thereto, said method comprising the steps of:

forming at least one groove of predetermined depth in the first surface of the transducer plate whereby the first surface consists of at least two spaced mounting zones separated by said at least one groove;

bonding said transducer plate mounting zones of said first surface to the optical medium;

polishing the second exposed surface of said bonded transducer plate in order to reduce the transducer plate to a thickness which is less than the predetermined depth of said grooves in order to expose said grooves thereby rendering at least two separated transducer elements bonded to the optical medium.

2. The method of bonding a single acoustic transducer plate to an optical medium according to claim 1 wherein at least two spaced electrodes are on the surface of the optical medium to be bonded to the transducer plate, and including the step of defining the mounting zones on the transducer plate first surface to align with said spaced electrodes.

3. A single transducer plate for use in combination with an optical medium wherein said single transducer plate is bonded to the optical medium and then polished for the construction of an acousto-optic device having having at least two separate transducer elements formed from said single transducer plate, each of which is of a first predetermined thickness, said single transducer plate comprising: a body having a first surface which faces the optical medium, a second exposed surface opposite thereto, and a thickness greater than said first predetermined thickness; said first surface having at least one transverse groove therein separating said first surface into at least two spaced mounting zones to be bonded to the optical medium, said groove being of a predetermined depth greater than said first predetermined depth, wherein after bonding, said second exposed surface is polished in order to expose said grooves to render at least two separated transducer elements individually bonded to the optical medium.

* * * * *